(12) United States Patent
Fong et al.

(10) Patent No.: US 10,037,479 B2
(45) Date of Patent: Jul. 31, 2018

(54) HUMAN-ASSISTED LEARNING IN EYE TRACKING APPLICATIONS

(71) Applicant: Medstar Health, Columbia, MD (US)

(72) Inventors: Allan Fong, Arlington, VA (US); Daniel Hoffman, Columbia, MD (US); Raj Ratwani, Columbia, MD (US); A. Zachary Hettinger, Columbia, MD (US)

(73) Assignee: MEDSTAR HEALTH, Columbia, MD (US)

( * ) Notice: Subject to any disclaimer, the term of this patent is extended or adjusted under 35 U.S.C. 154(b) by 0 days.

(21) Appl. No.: 15/279,835

(22) Filed: Sep. 29, 2016

(65) Prior Publication Data

US 2017/0091591 A1 Mar. 30, 2017

Related U.S. Application Data

(60) Provisional application No. 62/234,255, filed on Sep. 29, 2015.

(51) Int. Cl.
*G06K 9/00* (2006.01)
*G06K 9/62* (2006.01)
(Continued)

(52) U.S. Cl.
CPC ........... *G06K 9/6263* (2013.01); *G06F 3/013* (2013.01); *G06K 9/00604* (2013.01);
(Continued)

(58) Field of Classification Search
CPC ............... G06K 9/6263; G06K 9/6215; G06K 9/00604; G06K 9/2081; G06K 9/4642; G06F 3/013
See application file for complete search history.

(56) References Cited

U.S. PATENT DOCUMENTS

| 2009/0123025 A1* | 5/2009 | Deng | G06K 9/00711 382/100 |
| 2014/0205143 A1* | 7/2014 | Zhang | G06K 9/00845 382/103 |
| 2016/0259977 A1* | 9/2016 | Asbun | A61B 5/165 |

OTHER PUBLICATIONS

Brone et al., Automatic analysis of eye-tracking data using object detection algorithms; UbiComp '12, Sep. 5-Sep. 8, 2012, Pittsburgh, USA, pp. 677-680.*

(Continued)

*Primary Examiner* — Ping Hsieh
(74) *Attorney, Agent, or Firm* — Tarolli, Sundheim, Covell & Tummino LLP

(57) ABSTRACT

Systems and methods for eye tracking include a video capture component that provides a video of an environment and a set of gaze tracking coordinates for the video. A library stores a plurality of feature sets representing respective areas of interest with respective object labels. An image annotation component extracts a plurality of features from a region of interest and matches the extracted features to an area of interest in the library to produce a selected area of interest and a confidence value. A verification component accepts the selected area of interest if the confidence value meets a threshold value and sends the region of interest to a human expert to assign an object label if the confidence value does not. The library is dynamically updated in response to input from the human expert to add new areas of interest and new object labels to the library.

16 Claims, 2 Drawing Sheets

(51) Int. Cl.
    *G06K 9/20*         (2006.01)
    *G06K 9/46*         (2006.01)
    *G06F 3/01*         (2006.01)

(52) U.S. Cl.
    CPC ......... *G06K 9/2081* (2013.01); *G06K 9/4642* (2013.01); *G06K 9/6215* (2013.01)

(56) References Cited

OTHER PUBLICATIONS

Roto, Virpi, et al. "Examining mobile phone use in the wild with quasi-experimentation." Helsinky Institute for Information Technology (HILT), Technical Report 1 (2004): 2004.

De Beugher, Stijn, et al. "Automatic analysis of eye-tracking data using object detection algorithms." Proceedings of the 2012 ACM Conference on Ubiquitous Computing. ACM, 2012.

Brône, Geert, Bert Oben, and Toon Goedemé, "Towards a more effective method for analyzing mobile eye-tracking data: integrating gaze data with object recognition algorithms." Proceedings of the 1st international workshop on pervasive eye tracking & mobile eye-based interaction. ACM, 2011.

\* cited by examiner

HUMAN-ASSISTED LEARNING IN EYE TRACKING APPLICATIONS

RELATED APPLICATIONS

This application claims priority from U.S. patent application Ser. No. 62/234,255, filed 29 Sep. 2015, which is incorporated herein in its entirety.

TECHNICAL FIELD

This invention relates to machine learning, and more particularly, to human-assisted learning in eye tracking applications.

BACKGROUND OF THE INVENTION

The field of human computer interaction has benefited tremendously from the use of eye-tracking technology. Eye trackers provide unique insights linking the visual and cognitive process of humans to interactions with computer devices at a level of granularity that is deeper than explicit interaction, such as mouse movements or button pushes. Eye-trackers have been used to study the usability of interfaces to improve design, identify cognitive processing challenges, and have even been used as a mechanism to interact with interfaces. In addition, eye tracking technology has been used in real-time to provide augmented cognition environments, improving overall human performance and experience.

SUMMARY

In accordance with one aspect of the present invention, an eye tracking system includes a video capture component configured to provide a video of an environment and a set of gaze tracking coordinates representing, for each of a plurality of frames comprising the video, a position within the environment at which a user is looking. A library is configured to store a plurality of feature sets representing respective areas of interest, with each area of interest including an object label representing an object of interest within the environment. An image annotation component is configured to extract a plurality of features from a region of interest, defined around the gaze coordinates for a given frame, and match the extracted features to an area of interest in the library to produce a selected area of interest and a confidence value. A verification component is configured to accept the selected area of interest if the confidence value meets a threshold value and send the region of interest to a human expert at a user interface to assign it to an object label if the confidence value does not meet the threshold value. The library is dynamically updated in response to input from the human expert to add new areas of interest and new object labels to the library.

In accordance with another aspect of the present invention, a method is provided for annotating a video of an environment in an eye tracking system. The video and a set of gaze tracking coordinates are acquired. The gaze tracking coordinates represent, for each of a plurality of frames comprising the video, a position within the environment at which a user is looking. A set of features are extracted from a region of interest defined around the gaze coordinates for a given frame. An area of interest is selected from at least one stored area of interest in a library by comparing the extracted set of features to at least one set of features corresponding to the at least one stored area of interest in the library to provide a confidence value. The selected area of interest is accepted if confidence value meets a threshold value. The region of interest is provided to a human expert for assignment of an object label if the confidence value does not meet a threshold value.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

In the context of the present disclosure, the singular forms "a," "an" and "the" can also include the plural forms, unless the context clearly indicates otherwise. The terms "comprises" and/or "comprising," as used herein, can specify the presence of stated features, steps, operations, elements, and/or components, but do not preclude the presence or addition of one or more other features, steps, operations, elements, components, Traditional eye-tracking studies have been relegated to tracking eye movements as a user interacts with an interface displayed on a fixed computer monitor. Recent advances in eye-tracking technology have led to the development of several different mobile eye-tracking platforms that allow for tracking eye movements as people interact in their real-world environment, such as in a clinical environment or in a cockpit. Mobile eye-trackers hold tremendous promise, but, there are several data analysis challenges presented by mobile eye-tracking technology, particularly the identification of specific objects in highly dynamic environment.

The inventors have provided an approach for mobile eye tracking data analysis that dramatically reduces the burden of analysis, opening the door for more robust mobile eye tracking studies. With a traditional stationary eye-tracker, the analysis of eye movement data involves identifying areas of interest (AOIs), which are typically fixed areas of the interface, and identifying when the eyes land in those fixed areas. Making sense of mobile eye-tracking data when the user is moving and there is no fixed environment presents several analysis challenges.

To begin with, AOIs are no longer fixed and do not have to be two dimensional, such as a specific location on a computer monitor. Instead one must consider three-dimensional objects of interests (OOIs). OOIs can be viewed from multiple perspectives, either as the participant or the object moves in the environment. This results in several different and unique AOIs of the same OOI. Further, changes in environmental lighting and occlusion of objects make it difficult to consistently identify objects. For example, a nurse walking around a room and working with a patient might be partially occluded in part by the built environment or medical equipment. This is complicated further as the state of OOIs can also change during an observation, such as placing an intubation mask on a patient's face or changing the display setting on a monitor. These factors make it very challenging to fully automate the analysis of mobile eye tracking data collected in the real-world.

Figure 1:
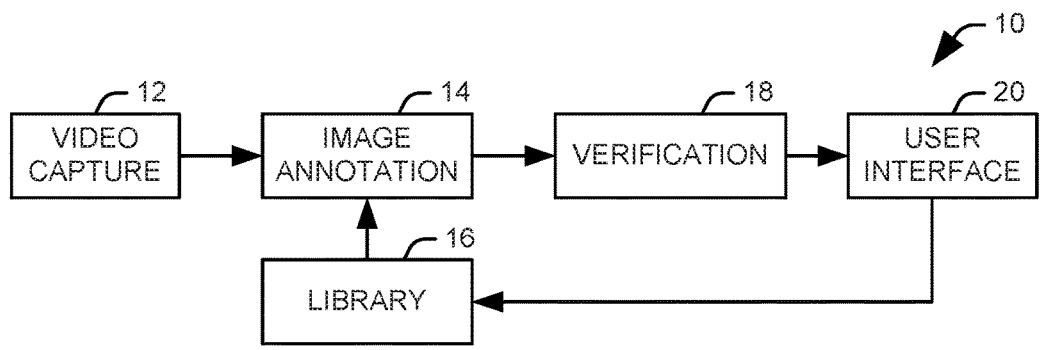
FIG. 1 illustrates an eye tracking system in accordance with an aspect of the present invention.

FIG. 1 illustrates one example of an eye tracking system 10 in accordance with an aspect of the present invention. The system 10 includes a video capture component 12 configured to provide a video of an environment and a set of gaze tracking coordinates representing, for each of a plurality of frames comprising the video, a position within the environment at which a user is looking. For example, the video capture component 12 can include a camera recording the environment and a camera tracking the eyes of the user to determine where the user is looking, as well as appropriate software or digital logic for matching the user's eye movement to the recorded scene.

A library 14 stores a plurality of feature sets representing respective areas of interest, with each area of interest including an object label representing an object of interest within the environment. It will be appreciated that a given object can be represented by multiple areas of interest representing, for example, multiple views of the object. An image annotation component 16 extracts a plurality of features from a region of interest, defined around the gaze coordinates for a given frame. The region of interest can be any appropriate shape, and is generally centered on the gaze coordinates. In one implementation, the region of interest is defined as a rectangular region having sides with lengths between forty-one and one-hundred twenty pixels per side. The extracted features can include any appropriate features for distinguishing among objects. For example, the extracted features can include a plurality of features extracted from a measured optical flow between two frames of the video within the region of interest and a plurality of features extracted via a spatial pyramid histogram technique.

The image annotation component 16 then matches the extracted features to an area of interest in the library to produce a selected area of interest and a confidence value. In one implementation, the image annotation component 16 calculates the confidence value as a distance metric between the set of features extracted from the region of interest and each of the plurality of feature sets stored in the library. For example, the distance metric can be a Euclidean distance metric. A verification component 18 accepts the selected area of interest if the confidence value meets a threshold value and sends the region of interest to a human expert at a user interface 20 to assign an object label to the region of interest if the confidence value does not meet the threshold value. It will be appreciated that the confidence value can be adjusted dynamically, such that the verification component 18 uses a first confidence value for a given frame of the plurality of frames comprising the video and uses a second confidence value for another frame of the plurality of frames comprising the video. In one implementation, the verification component 18 changes the confidence value dynamically according to input from the human expert, and in another implementation, the verification component changes the confidence value dynamically according to an object label associated with the selected area of interest.

In accordance with an aspect of the present invention, the library 14 is dynamically updated in response to input from the human expert to add new areas of interest and new object labels to the library. Accordingly, the performance of the system can be increased with each interaction with the human expert, allowing for enhanced autonomous operation for the system. In one implementation, the entire library 14 can be populated dynamically. For example, for a first frame of the video, the library 14 has no stored feature sets, and all of the feature sets representing respective areas of interest in the library are extracted from the video with object labels provided via the user interface 20. The regions of interest can be provided to the human expert separately, or as sets of similar regions of interest. For example, where a user has been gazing at an object for several frames, the regions of interest for those frames might have very similar extracted features (e.g., related by a subthreshold distance metric) can be passed to the human expert as a batch for review. Using this human in the loop approach, the system 10 can operate on a new video with no previous training or human intervention, allowing for immediate analysis of freshly acquired video.

Figure 2:
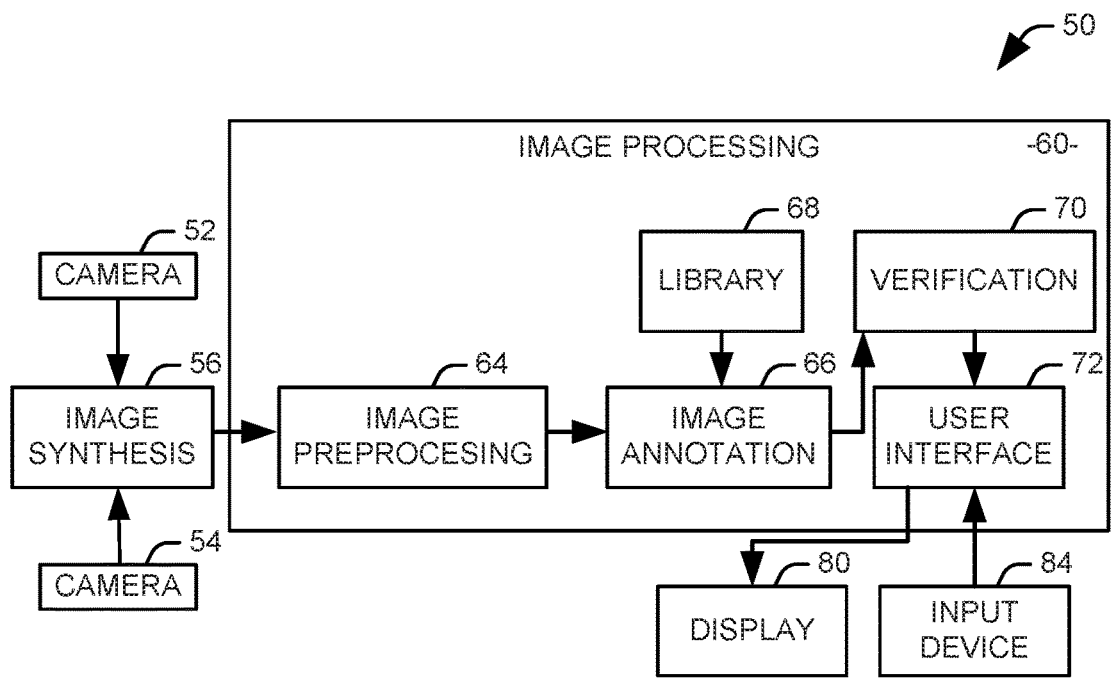
FIG. 2 illustrates an example implementation of an eye tracking system in accordance with an aspect of the present invention.

FIG. 2 illustrates an example implementation of an eye tracking system 50 in accordance with an aspect of the present invention. The system 50 includes an eye camera 52 for recording pupil movement in a user's eye, and a forward-looking camera, referred to herein as a scene camera 54, for capturing an image of an environment of interest. The output signals from these cameras 52 and 54 are provided to an image synthesis component 56. The image synthesis component 56 configured to calibrate and synchronize the videos output from the cameras 52 and 54, to provide an integrated video of where in the environment the user is looking, or their gaze coordinates. The resulting output is a scene video, representing the environment, and a file of frame-by-frame pupil gaze coordinates for the corresponding scene video. It will be appreciated that not all frames will have gaze coordinates. For example, the user can be looking at a point away from the environment monitored by the scene camera or have momentarily closed his or her eyes.

The output of the image synthesis component 56 is provided to an image processing component 60. It will be appreciated that the image processing component 60 can be implemented as dedicated hardware, machine executable instructions stored on one or more non-transitory computer readable media and executed by an associated processor, or a combination of hardware and software. The image processing component 60 includes an image preprocessing component 64 configured to define, within each frame of the video, a region of interest around the gaze coordinates of the user. It will be appreciated that no region of interest is defined within a frame for which gaze coordinates are not available. In one example, the region of interest is defined to include a square region of between forty-one and one-hundred twenty pixels per side around the determined gaze coordinates, although it will be appreciated that other regions, such as rectangular, circular, or elliptical regions can be utilized in some applications. In one implementation, the region of interest is defined as a square region having sides that are one-hundred pixels in length.

An image annotation component 66 is configured to identify the region of interest as an object of interest associated with the environment. Specifically, the image annotation component 66 compares each region of interest to a library 68 of identified areas of interest. It will be appreciated that, due to the different appearance of objects from different views, a given object within the scene can be represented by multiple areas of interest within the library 68. In one implementation, features are extracted from the region of interest via a spatial pyramid histogram technique. In a spatial pyramid technique, the region of interest is repeatedly subdivided, with histograms of local features computed at increasingly fine resolutions to provide the feature set. In another implementation, an optical flow between two frames of the video within the region of interest can be measured, with features extracted from the measured optical flow. It will be appreciated that, in practice, these feature sets, along with other appropriate spatial, chromatic, and kinematic features extracted from the region of interest can be utilized in combination.

Once the features have been extracted, the image annotation component 66 can calculate a distance metric between the feature sets representing each identified area of interest within the library 68 and the feature set extracted from the region of interest. In one implementation, a Euclidean distance metric is used, but it will be appreciated that other distance metrics, such as a covariance-weighted distance (e.g., a Mahalanobis distance), a Manhattan distance, or a Chebyshev distance. The distance between the feature sets operates as an inverse similarity measure on the represented images, such that an area of interest within the library 68 having the lowest distance for a given region of interest represents a most likely match for the region of interest, and the discussion below assumes that such a distance metric is used. It will be appreciated, however, that the distance metric could instead be calculated as a similarity measure for which the values would instead directly correspond to the similarity of a previously identified area of interest and the region of interest.

The object annotation component 66 compares the calculated distance metrics for all of the areas of interest and selects an area of interest, and corresponding object, having the lowest distance metric as representing the region of interest. The selected area of interest and object are provided to a verification component 70. In the illustrated implementation, the verification component 70 compares the distance metric for the selected area of interest to a threshold value, and accepts the classification of the region of interest as the object represented by the area of interest if the distance metric is below the threshold. It will be appreciated that the threshold can be static or object specific, for example, based on a user-specified importance of each object. If the verification component 70 determines that the distance metric is above the threshold, the region of interest is passed to a user interface 72 for review by a human expert at an associated display 80. It will be appreciated that regions of interest can be provided to the human expert as they arise or stored to allow a set of similar regions of interest to be provided to the human expert.

In the illustrated implementation, the human expert can provide one of three inputs to the system at an input device 84 such as a keyboard, mouse, touchscreen, or microphone. If the region of interest does not represent an object of interest within the environment, the image processing component 60 can be instructed to simply ignore the region of interest and proceed to a next frame. If the region of interest represents an object that has been encountered previously, an object label can be provided to the system for the selected area of interest. The area of interest is then added to the library 68 with the appropriate object label. Finally, the human expert can identify the area of interest as representing a new object. In this case, the new object is added as an object label in the library 68 and the area of interest is added as a new feature set in the library associated with the new object. This continues until all frames of the video have been evaluated.

In one implementation, the rejection threshold can be dynamically determined by the verification component 70 based on feedback from the human expert. Specifically, the verification component 70 can track instances in which the human verifies the selected object label as opposed to selecting a new or different existing object. In one example, the distance metrics associated with each instance of feedback can be tracked and grouped as instances in which the object label was correct, but rejected under the threshold, or where the human expert selected a different object. A new threshold can be assigned when it is determined that, for a predetermined number of object assignments, the correct object would have been selected a predetermined percentage of the time using the new threshold. The number and percentage of correct selections can vary with the application, but in one implementation, a percentage of one hundred percent can be utilized.

By allowing human experts to assign new objects during the annotation process, the system 50 can annotate a video from a naïve state, without any existing labels in the library 68. Instead areas of interest are dynamically identified and annotated either by the computer or the human. Accordingly, a given video can be quickly analyzed without any significant preparatory work by a human expert, with the training of the system 50 occurring dynamically during the annotation process.

Figure 3:
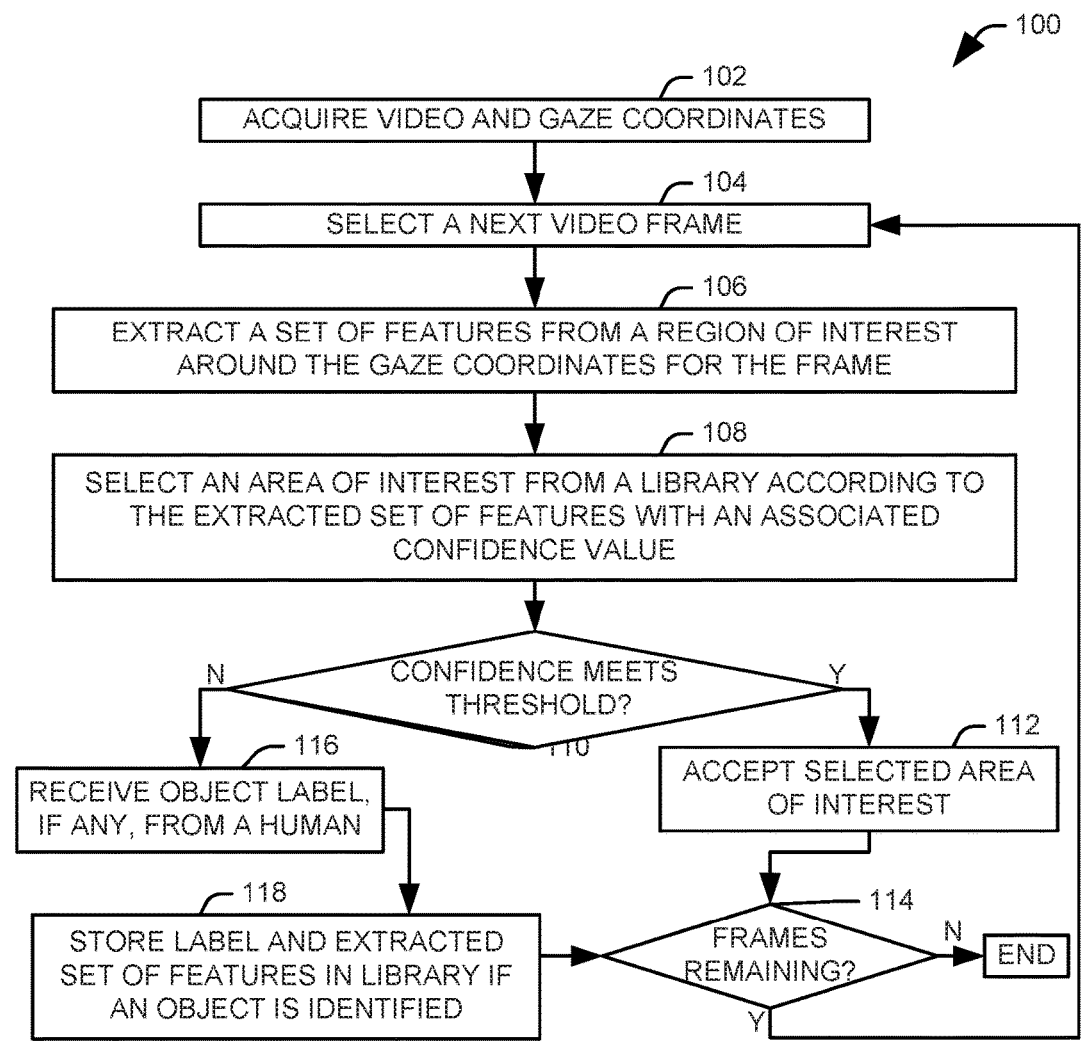
FIG. 3 illustrates an example of a method for annotating a video of an environment in an eye tracking system.

In view of the foregoing structural and functional features described above in FIGS. 1 and 2, an example method will be better appreciated with reference to FIG. 3. While, for purposes of simplicity of explanation, the method of FIG. 3 is shown and described as executing serially, it is to be understood and appreciated that the present invention is not limited by the illustrated order, as some actions could in other examples occur in different orders and/or concurrently from that shown and described herein.

FIG. 3 illustrates an example of a method 100 for annotating a video of an environment in an eye tracking system. At 102, the video and a set of gaze tracking coordinates are acquired. The gaze coordinates represent, for each of a plurality of frames comprising the video, a position within the environment at which a user is looking. At 104, a next video frame is selected. At the beginning of the process, the "next" video frame is a first video frame. At 106, a set of features is extracted from a region of interest defined around the gaze coordinates for the selected frame. In one example, a plurality of features can be extracted via a spatial pyramid histogram technique. Alternatively or additionally, a plurality of features can be extracted from a measured optical flow between two frames of the video within the region of interest.

At 108, an area of interest is selected from at least one stored area of interest in a library by comparing the extracted set of features to at least one set of features corresponding to the at least one stored area of interest in the library to provide a confidence value. In one implementation, this includes calculating a Euclidean distance metric between the set of features extracted from the region of interest and each feature set stored in the library. The area of interest having a smallest distance metric can be selected, with the distance metric serving as the confidence value. At 110, it is determined if the confidence value meets a threshold. For example, where the confidence metric is a distance metric, it can be determined if the distance metric falls below the threshold.

If the confidence value meets the threshold (Y), the selected area of interest and its associated object label are accepted at 112. The method then advances to 114. If the confidence value does not meet the threshold (N), the region of interest is provided to a human expert for assignment of an object label at 116. It will be appreciated that the human expert can identify the region of interest as not containing an object of interest, in which can no object label is assigned. The features extracted from the region of interest and the assigned object label are then stored in the library as a new area of interest at 118 if an object label is assigned by the human expert. The method then advances to 114, where it is determined if additional frames remain for processing. If not (N), the method terminates. If so (Y), the method returns to 104 to select a new frame.

It will be appreciated that the method 100 can begin with no prior training, such that no areas of interest are stored in the library when a first frame of video is selected. To this end, a plurality of features is extracted from a region of interest defined around the gaze coordinates for a first frame of the plurality of frames. The region of interest is provided to the human expert via the user interface, and an object label is received for the region of interest. The extracted plurality of features and the received object label are then stored as a first area of interest in the library.

Figure 4:
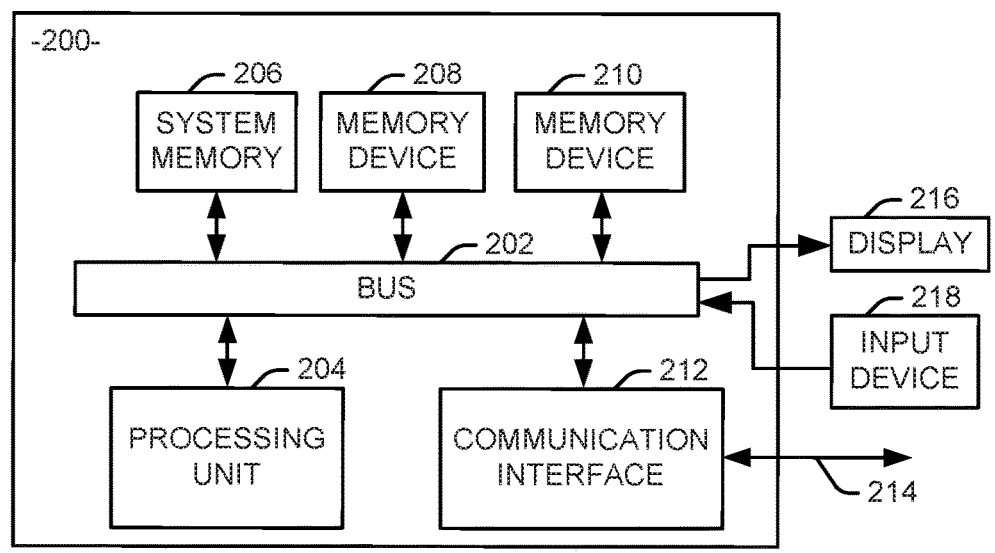
FIG. 4 is a schematic block diagram illustrating an exemplary system of hardware components capable of implementing examples of the system disclosed in FIGS. 1-3.

FIG. 4 is a schematic block diagram illustrating an exemplary system 200 of hardware components capable of implementing examples of the systems and methods disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of an eye tracking system in accordance with the present invention. Computer executable logic for implementing the eye tracking system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can, in practice, refer to multiple, operatively connected apparatuses for storing machine executable instructions.

What have been described above are examples of the present invention. It is, of course, not possible to describe every conceivable combination of components or methodologies for purposes of describing the present invention, but one of ordinary skills in the art will recognize that many further combinations and permutations of the present invention are possible. Accordingly, the present invention is intended to embrace all such alterations, modifications, and variations that fall within the scope of the appended claims.

What is claimed is:

1. An eye tracking system comprising:
   a video capture component configured to provide a video of an environment and a set of gaze tracking coordinates representing, for each of a plurality of frames comprising the video, a position within the environment at which a user is looking;
   a library, configured to store a plurality of feature sets representing respective areas of interest, with each area of interest including an object label representing an object of interest within the environment;
   an image annotation component configured to extract a plurality of features from a region of interest, defined around the gaze coordinates for a given frame, and match the extracted features to an area of interest in the library to produce a selected area of interest and a confidence value; and
   a verification component configured to accept the selected area of interest if the confidence value meets a threshold value and send the region of interest to a human expert at a user interface to assign an object label to the region of interest if the confidence value does not meet the threshold value;
   wherein the library is dynamically updated in response to input from the human expert to add new areas of interest and new object labels to the library.

2. The eye tracking system of claim 1, wherein the set of features extracted from the region of interest comprises a plurality of features extracted from a measured optical flow between two frames of the video within the region of interest.

3. The eye tracking system of claim 1, wherein the set of features extracted from the region of interest comprises a plurality of features extracted via a spatial pyramid histogram technique.

4. The eye tracking system of claim 1, wherein the image annotation component is configured to match the set of features extracted from the region of interest to an area of interest in the library by calculating a distance metric between the set of features extracted from the region of interest and each of the plurality of feature sets stored in the library.

5. The eye tracking system of claim 4, wherein the distance metric is a Euclidean distance metric, and the threshold is a threshold distance between the set of features extracted from the region of interest and the feature set associated with the selected region of interest.

6. The eye tracking system of claim 1, wherein, for a first frame of the video, the library has no stored feature sets, such that each of the plurality of feature sets representing respective areas of interest in the library are extracted from the video with object labels provided via the user interface.

7. The eye tracking system of claim 1, wherein the verification component uses a first confidence value for a given frame of the plurality of frames comprising the video and uses a second confidence value for another frame of the plurality of frames comprising the video.

8. The eye tracking system of claim 7, wherein the verification component changes the confidence value dynamically according to input from the human expert.

9. The eye tracking system of claim 7, wherein the verification component changes the confidence value dynamically according to an object label associated with the selected area of interest.

10. The eye tracking system of claim 1, wherein the region of interest is defined to include a rectangular region centered on the set of gaze coordinates and having sides with lengths between forty-one and one-hundred twenty pixels per side.

11. A method for annotating a video of an environment in an eye tracking system comprising:
- acquiring the video and a set of gaze tracking coordinates representing, for each of a plurality of frames comprising the video, a position within the environment at which a user is looking;
- extracting a set of features from a region of interest defined around the gaze coordinates for a given frame;
- selecting an area of interest from at least one stored area of interest in a library by comparing the extracted set of features to at least one set of features corresponding to the at least one stored area of interest in the library to provide a confidence value;
- accepting the selected area of interest if confidence value meets a threshold value; and
- providing the region of interest to a human expert for assignment of an object label if the confidence value does not meet a threshold value.

12. The method of claim 11, further comprising storing the extracted plurality of features and the assigned object label as an area of interest in the library.

13. The method of claim 11, further comprising:
- extracting a plurality of features from a region of interest defined around the gaze coordinates for a first frame of the plurality of frames;
- providing the region of interest to the human expert via the user interface;
- receiving the object label for region of interest; and
- storing the extracted plurality of features and the received object label as a first area of interest in the library.

14. The method of claim 11, wherein selecting the area of interest from the at least one stored area of interest in a library comprises calculating a Euclidean distance metric between the set of features extracted from the region of interest and each of the at least one feature set stored in the library.

15. The method of claim 11, wherein extracting the set of features from the region of interest comprises:
- extracting a plurality of features via a spatial pyramid histogram technique; and
- extracting a plurality of features from a measured optical flow between two frames of the video within the region of interest.

16. An eye tracking system comprising:
- a video capture component configured to provide a video of an environment and a set of gaze tracking coordinates representing, for each of a plurality of frames comprising the video, a position within the environment at which a user is looking;
- a library, configured to store a plurality of feature sets representing respective areas of interest, with each area of interest including an object label representing an object of interest within the environment;
- an image annotation component configured to extract a plurality of features from a region of interest, defined around the gaze coordinates for a given frame, and match the extracted features to an area of interest in the library to produce a selected area of interest and a confidence value, the plurality of features comprising a plurality of features extracted from a measured optical flow between two frames of the video within the region of interest; and
- a verification component configured to accept the selected area of interest if the confidence value meets a threshold value and send the region of interest to a human expert at a user interface to assign an object label to the region of interest if the confidence value does not meet the threshold value;
- wherein the library is dynamically updated in response to input from the human expert to add new areas of interest and new object labels to the library.

* * * * *